(12) United States Patent
Chen et al.

(10) Patent No.: US 8,310,629 B2
(45) Date of Patent: Nov. 13, 2012

(54) TRANSFLECTIVE LIQUID CRYSTAL DISPLAY PANEL AND LIQUID CRYSTAL DISPLAY DEVICE HAVING THE SAME

(75) Inventors: Chien-Hong Chen, Tainan (TW); Chih-Yung Hsieh, Tainan (TW); Ying-Jen Chen, Tainan (TW)

(73) Assignee: Chimei Innolux Corporation (TW)

( * ) Notice: Subject to any disclaimer, the term of this patent is extended or adjusted under 35 U.S.C. 154(b) by 572 days.

(21) Appl. No.: 12/558,764

(22) Filed: Sep. 14, 2009

(65) Prior Publication Data
US 2010/0066965 A1   Mar. 18, 2010

(30) Foreign Application Priority Data
Sep. 15, 2008  (TW) ................................ 97135387 A

(51) Int. Cl.
*G02F 1/1335* (2006.01)
*G02F 1/1337* (2006.01)
*G02F 1/1343* (2006.01)

(52) U.S. Cl. ......... 349/109; 349/106; 349/129; 349/146

(58) Field of Classification Search ................... 349/129, 349/143–144, 146, 106, 109
See application file for complete search history.

(56) References Cited

U.S. PATENT DOCUMENTS

| | | | | |
|---|---|---|---|---|
| 2005/0068477 A1* | 3/2005 | Shin et al. | ...................... | 349/106 |
| 2007/0070269 A1* | 3/2007 | Song | .............................. | 349/106 |
| 2007/0236637 A1* | 10/2007 | Hsieh et al. | .................. | 349/129 |
| 2008/0024706 A1* | 1/2008 | Yang et al. | ..................... | 349/129 |

* cited by examiner

*Primary Examiner* — Nathanael R Briggs
(74) *Attorney, Agent, or Firm* — Trop, Pruner & Hu, P.C.

(57) ABSTRACT

A liquid crystal display (LCD) device including a backlight module and an LCD panel is provided. The backlight module is used for providing light penetrating through the LCD panel disposed at one side of the backlight module. The LCD panel includes a substrate, a scan line, a first and a second data line, a first and a second switch element and a first and a second pixel electrode. The scan line and the two data lines, which are perpendicular to the scan line, are disposed on the substrate. The switch elements are respectively disposed at the intersection of the scan line and the first data line and the intersection of the scan line and the second data line. The pixel electrodes are respectively electrically connected to the switch elements. The area of the first pixel electrode is substantially less than that of the second one.

15 Claims, 6 Drawing Sheets

TRANSFLECTIVE LIQUID CRYSTAL DISPLAY PANEL AND LIQUID CRYSTAL DISPLAY DEVICE HAVING THE SAME

This application claims the benefit of Taiwan application Serial No. 97135387, filed Sep. 15, 2008, the subject matter of which is incorporated herein by reference.

BACKGROUND OF THE INVENTION

1. Field of the Invention

The invention relates in general to a liquid crystal display panel and a liquid crystal display device using the same, and more particularly to a multi-domain liquid crystal display panel and a liquid crystal display device using the same.

2. Description of the Related Art

Consumer electronic products have been more and more popular in the recent years. All kinds of electronic products, such as mobile phones, laptop computers and liquid crystal display (LCD) televisions, have already become a vital part of people's daily lives, especially thin-type LCD devices. LCD devices have become the most popular type of displays and televisions because of their low power consumption and compact size and gradually replace the conventional cathode ray tube (CRT) displays. As the market demand for LCD devices has increased greatly, consumers demand the LCD devices with better features, such as large viewing angle, high contrast ratio and accurate color temperature.

When an image is viewed along the normal direction of the display panel of the conventional vertical alignment LCD device, the gamma values of red, green and blue gamma curves decrease in the following order: red>green>blue. As a result, at different gray levels, a color temperature shift phenomenon will occurs at a chromaticity point of the white light generated by color mixing. For example, the color temperature of white light at gray level 128 is higher than that of white light at gray level 255. Therefore, the accuracy of color display of the LCD device is affected seriously.

One existing industrial solution is to use red, green and blue gray-levels to represent the white gray-level to be displayed. However, when different colors at different gray-levels are displayed, a lot of memory space is needed to respectively buffer the data of red, green and blue colors, which relatively increases the manufacturing cost of the LCD device.

SUMMARY OF THE INVENTION

The invention is directed to a liquid crystal display (LCD) panel and a LCD device using the same. The areas of the pixel electrodes corresponding to different data lines are different. Accordingly, the gamma curves corresponding to different pixel electrodes compensate each other, for lowering the color temperature shift phenomenon of the image at different gray levels. Therefore, the display quality is improved.

According to the present invention, a LCD panel is provided. The LCD panel includes a substrate, a scan line, a first data line, a second data line, a first switch element, a first pixel electrode, a second switch element and a second pixel electrode. The scan line, the first data line and the second data line are disposed on the substrate. The first data line and the second data line are perpendicular to the scan line. The first switch element is disposed at the intersection of the scan line and the first data line. The second switch element is disposed at the intersection of the scan line and the second data line. The first pixel electrode is electrically connected to the first switch element. The second pixel electrode is electrically connected to the second switch element. The area of the first pixel electrode is less than that of the second pixel electrode.

According to the present invention, a LCD device is provided. The LCD device includes a backlight module and a LCD panel. The backlight module is used for providing light penetrating through the LCD panel. The LCD panel is disposed at one side of the backlight module and includes a substrate, a scan line, a first data line, a second data line, a first switch element, a first pixel electrode, a second switch element and a second pixel electrode. The scan line, the first data line and the second data line are disposed on the substrate. The first data line and the second data line are perpendicular to the scan line. The first switch element is disposed at the intersection of the scan line and the first data line. The second switch element is disposed at the intersection of the scan line and the second data line. The first pixel electrode is electrically connected to the first switch element. The second pixel electrode is electrically connected to the second switch element. The area of the first pixel electrode is less than that of the second pixel electrode.

According to the present invention, a LCD panel is provided. The LCD panel includes a first substrate, a scan line, a first data line, a second data line, a first switch element, a first pixel electrode, a second switch element, a second pixel electrode, a second substrate, a first common electrode and a second common electrode. The scan line, the first data line and the second data line are disposed on the first substrate. The first data line and the second data line are perpendicular to the scan line. The first switch element is disposed at the intersection of the scan line and the first data line. The second switch element is disposed at the intersection of the scan line and the second data line. The first pixel electrode is disposed on the first substrate and electrically connected to the first switch element. The second pixel electrode is disposed on the first substrate and electrically connected to the second switch element. The second substrate is disposed opposite to the first substrate. The first common electrode is disposed on the second substrate. At least part of the first common electrode overlaps the first pixel electrode. The second common electrode is disposed on the second substrate. At least part of the second common electrode overlaps the second pixel electrode. The overlapping area of the first pixel electrode and the first common electrode is less than that of the overlapping area of the second pixel electrode and the second common electrode.

According to the present invention, a LCD device is provided. The LCD device includes a backlight module and a LCD panel. The backlight module is used for providing light penetrating through the LCD panel. The LCD panel is disposed at one side of the backlight module. The LCD panel includes a first substrate, a scan line, a first data line, a second data line, a first switch element, a first pixel electrode, a second switch element, a second pixel electrode, a second substrate, a first common electrode and a second common electrode. The scan line, the first data line and the second data line are disposed on the first substrate. The first data line and the second data line are perpendicular to the scan line. The first switch element is disposed at the intersection of the scan line and the first data line. The second switch element is disposed at the intersection of the scan line and the second data line. The first pixel electrode is disposed on the first substrate and electrically connected to the first switch element. The second pixel electrode is disposed on the first substrate and electrically connected to the second switch element. The second substrate is disposed opposite to the first substrate. The first common electrode is disposed on the second substrate. At least part of the first common electrode overlaps the first pixel electrode. The second common electrode is disposed on the second substrate. At least part of the second common electrode overlaps the second pixel electrode. The overlapping area of the first pixel electrode and the first common electrode is less than that of the overlapping area of the second pixel electrode and the second common electrode.

The invention will become apparent from the following detailed description of the preferred but non-limiting embodiments. The following description is made with reference to the accompanying drawings.

DETAILED DESCRIPTION OF THE INVENTION

Figure 1:
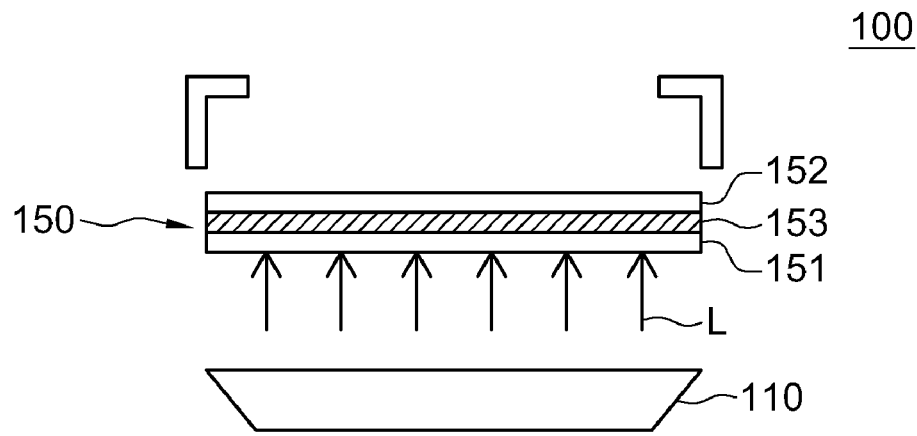
FIG. 1 illustrates a liquid crystal display device according to a preferred embodiment of the present invention.

The liquid crystal display (LCD) device according to a preferred embodiment of the present invention includes at least a backlight module and a LCD panel. The areas of the pixel electrodes of different color pixels in the LCD panel are different. As a result, the gamma curves of the color pixels compensate each other, so the displayed image has substantially the same color temperature at different gray levels. The display quality of the product is therefore improved. Some embodiments according to the present invention are provided as examples in the following paragraphs, but the present invention is not limited thereto. Furthermore, unnecessary components are not shown in the drawings of the embodiment for clarity.

Figure 2:
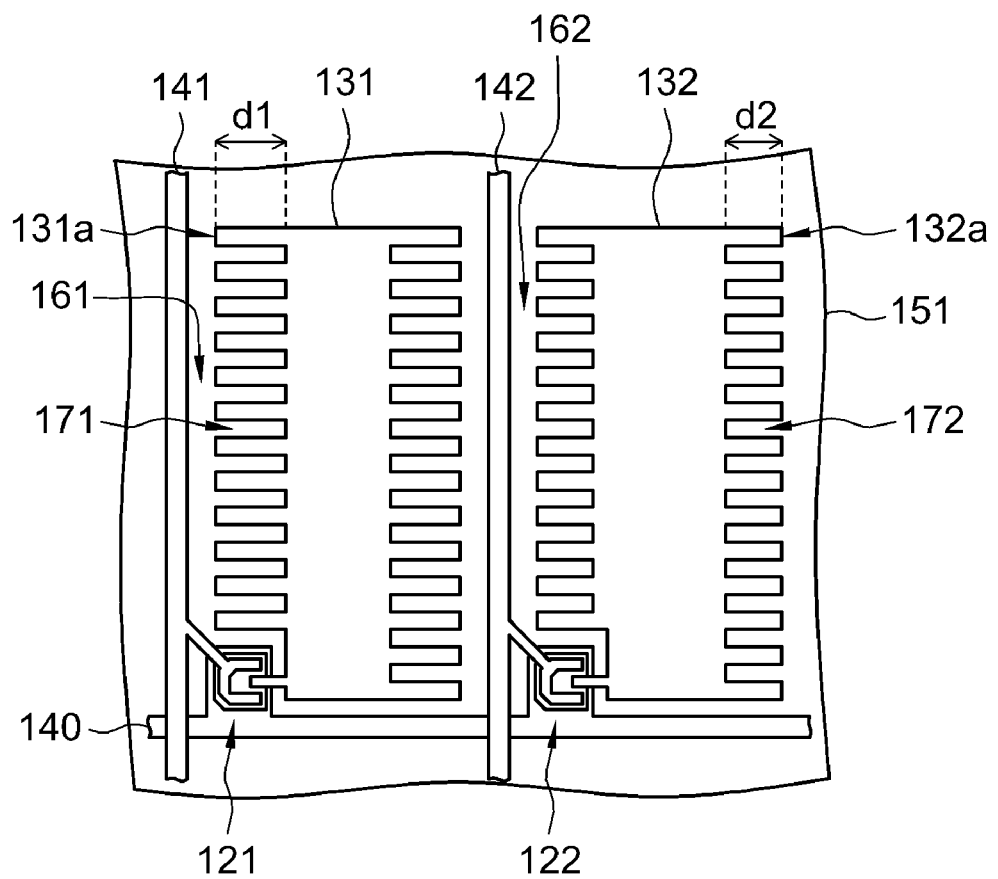
FIG. 2 illustrates a first substrate of the LCD device in FIG. 1.

Please refer to FIG. 1 and FIG. 2 at the same time. FIG. 1 illustrates a LCD device according to a preferred embodiment of the present invention. FIG. 2 illustrates a first substrate of the LCD device in FIG. 1. The LCD device 100 includes a backlight module 110 and a LCD panel 150. The backlight module 110 is used for providing light L penetrating through the LCD panel 150. The LCD panel 150 disposed at one side of the LCD module 110 includes the first substrate 151, a scan line 140, a first data line 141, a second data line 142, a first switch element 121, a first pixel electrode 131, a second switch element 122 and a second pixel electrode 132. The scan line 140, the first data line 141 and the second data line 142 are disposed on the first substrate 151. The first data line 141 and the second data line 142 are respectively perpendicular to the scan line 140. The first switch element 121 is disposed near the intersection of the scan line 140 and the first data line 141. The second switch element 122 is disposed near the intersection of the scan line 140 and the second data line 142. The first pixel electrode 131 is electrically connected to the first switch element 121, and the second pixel electrode 132 is electrically connected to the second switch element 122. The area of the first pixel electrode 131 is less than that of the second pixel electrode 132.

For example, the first pixel electrode 131 of the present embodiment is used for displaying blue, and the LCD panel 150 is a multi-domain vertical alignment (MVA) LCD panel. Because the area of the first pixel electrode 131 is less than that of the second pixel electrode 132, the gamma curve of the pixel corresponding to the first pixel electrode 131 is located below the gamma curve of the pixel corresponding to the second pixel electrode 132. As a result, the gamma curves corresponding the first pixel electrode 131 and the second pixel electrode 132 compensate each other, so that the LCD panel 150 has the same color temperature at different white gray-levels. The display quality is therefore improved. The following describes the details.

The structure of the LCD panel 150 is illustrated further. As shown in FIG. 2, the first pixel electrode 131 has at least a first main slit 161, and the second pixel electrode 132 has at least a second main slit 162. The first pixel electrode 131 has several first fine slits 171 and several first protruding edges 131a which are corresponding to the edge of the first main slit 161. The second pixel electrode 132 has several second fine slits 172 and several second protruding edges 132a which are corresponding to the edge of the second main slit 162. Many different designs can be applied to the present embodiment for making the area of the first pixel electrode 131 less than the area of the second pixel electrode 132. For example, the lengths of the first fine slits 171 can be substantially greater than that of the second fine slits 172, so that the area of the first pixel electrode 131 is less than the area of the second pixel electrode 132. As shown in FIG. 2, the lengths d1 of the first fine slits 171 are substantially greater than the lengths d2 of the second fine slits 172. On the whole, the area of the first pixel electrode 131 is less than the area of the second pixel electrode 132. Relatively speaking, the area of the first main slit 161 and the first fine slits 171 on the first substrate 151 is larger than the area of the second main slit 162 and the second fine slits 172 on the first substrate 151.

Moreover, the first fine slits 171 and the second fine slits 172 of the LCD panel 150 of the present embodiment can have different widths. Please refer to FIG. 3, which illustrates the design that the first fine slits 171 and the second fine slits 172 have different widths. The widths w1 of the first fine slits 171 of the first pixel electrode 131 is substantially greater than the widths w2' of the second fine slits 172' of the second pixel electrode 132'. Therefore, the area of the first pixel electrode 131 is less than the area of the second pixel electrode 132'.

Figure 4:
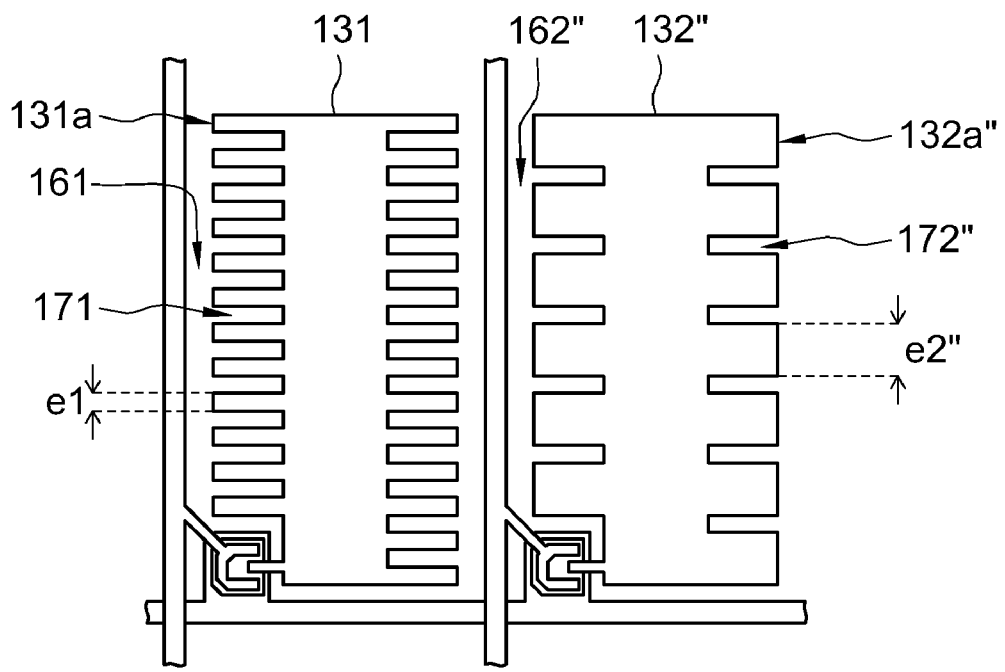
FIG. 4 illustrates the design that a first protruding edge and a second protruding edge have different widths.

Furthermore, the widths of the first protruding edges 131a can be different from that of the second protruding edges 132a to make the area of the first pixel electrode 131 less than the area of the second pixel electrode 132. Please refer to FIG. 4, which illustrates the design that the first protruding edges and the second protruding edges have different widths. The widths e1 of the first protruding edges 131a are substantially less than the widths e2" of the second protruding edges 132a". On the whole, the area of the first pixel electrode 131 is less than the area of the second pixel electrode 132".

When in practical use, the LCD panel 150 of the present embodiment can apply different designs at the same time, such as the design that the lengths d1 of the first fine slits 171 are less than the lengths d2 of the second fine slits 172, the design that the widths w1 of the first fine slits 171 are greater than the widths w2' of the second fine slits 172, the design that the widths e1 of the first protruding edges 131a are less than the widths e2" of the second protruding edges 132a and other designs as well. As a result, the area of the first pixel electrode 131 is less than that of the second pixel electrode 132. Other designs including changing the size of the protruding edges, the main slit and the fine slits to make the area of the first pixel electrode 131 less than the area of the second pixel electrode 132 are encompassed by the present invention.

On the other hand, the LCD panel 150 of the present embodiment can further include a third data line, a third switch element and a third pixel electrode. Please refer to FIG. 5, which illustrates the LCD panel including the first pixel electrode, the second pixel electrode and the third pixel electrode. The third data line 143 is disposed on the first substrate 151 and perpendicular to the scan line 140. The third switch element 123 is disposed near the intersection of the scan line 140 and the third data line 143. The third pixel electrode 133 is electrically connected to the third switch element 123. The area of the first pixel electrode 131 is less than the area of the third pixel electrode 133. The area of the second pixel electrode 132 and the area of the third pixel electrode 133 can be the same or different according to the demand. In other words, the area of the first pixel electrode 131, the area of the second pixel electrode 132 and the area of the third pixel electrode 133 can be substantially all different. Furthermore, the above designs of changing the lengths or widths of the protruding parts, the main slit and the fine slits can be applied to the pixel electrodes 131, 132 and 133 for making the area of the first pixel electrodes 131 less than the area of the second pixel electrode 132 and the area of the third pixel electrode 133.

Figure 6:
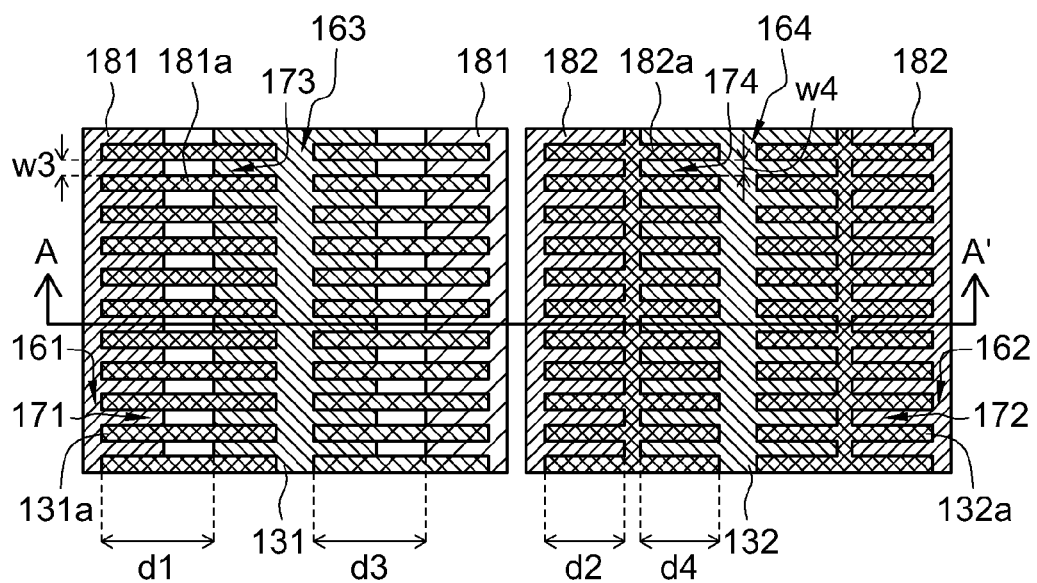
FIG. 6 illustrates the first pixel electrode, the second pixel electrode, a first common electrode and a second common electrode of the LCD panel.
Figure 7:
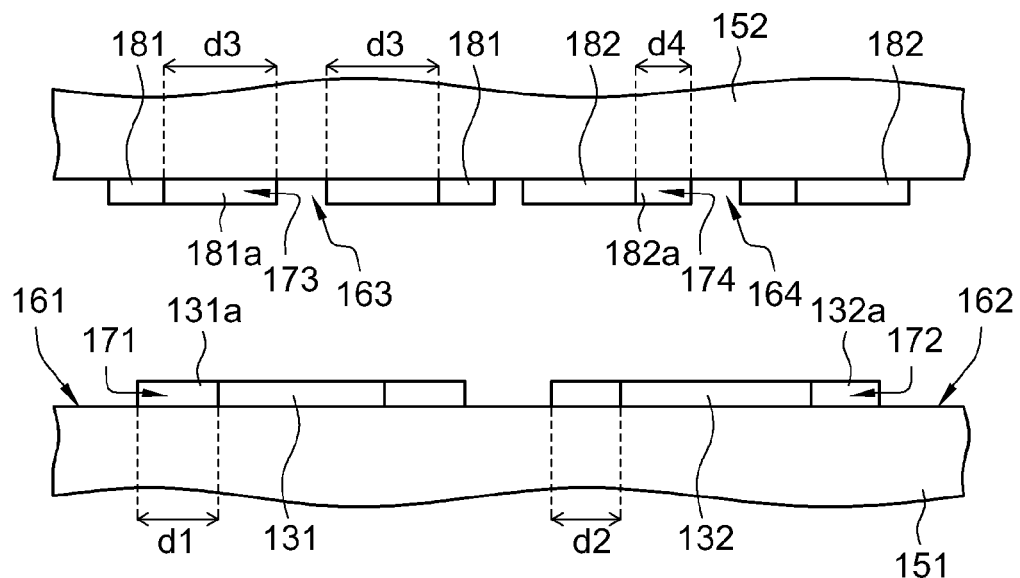
FIG. 7 shows a cross-sectional view along the line A-A' in FIG. 6.

When in practical use, the LCD panel 150 of the LCD device 100 of the present embodiment can further include a second substrate 152 (shown in FIG. 1), a first common electrode 181 (shown in FIG. 6) and a second common electrode 182 (shown in FIG. 6). Please refer to FIG. 6 and FIG. 7 at the same time. FIG. 6 illustrates the first pixel electrode, the second pixel electrode, the first common electrode and the second common electrode according to the preferred embodiment of the present invention. FIG. 7 shows a cross-sectional view along the line A-A' in FIG. 6. The second substrate 152 is disposed opposite to the first substrate 151. The first common electrode 181 is disposed on the second substrate 152. At least part of the first common electrode 181 overlaps the first pixel electrode 131. The second common electrode 182 is disposed on the second substrate 152. At least part of the second common electrode 182 overlaps the second pixel electrode 132. The overlapping area of the first pixel electrode 131 and the first common electrode 181 is less than the overlapping area of the second pixel electrode 132 and the second common electrode 182. Moreover, a color filter can further be disposed on the second substrate 152.

Speaking more specifically, the first common electrode 181 and the second common electrode 182 respectively have at least a third main slit 163 and at least a fourth main slit 164. The first common electrode 181 has several third fine slits 173 and several third protruding edges 181a which are corresponding to the edge of the third main slit 163. The second common electrode 182 has several fourth fine slits 174 and several fourth protruding edges 182a which are corresponding to the edge of the fourth main slit 164. The lengths of the first fine slits 171 or the third fine slits 173 are greater than the lengths of the second fine slits 172 or the fourth fine slits 174. In the practical designs shown in FIG. 6 and FIG. 7, the lengths d1 of the first fine slits 171 are greater than the lengths d2 of the second fine slits 172, and the lengths d3 of the third fine slits 173 are greater than the lengths d4 of the fourth fine slits 174. More specifically speaking, the lengths d1 of the first fine slits 171 are for example substantially equal to the lengths d3 of the third fine slits 173. The lengths d2 of the second fine slits 172 are for example substantially equal to the lengths d4 of the fourth fine slits 174. Besides, at least part of the first fine slits 171 overlaps the third fine slits 173, and the second fine slits 172 do not overlap the fourth fine slits 174. However, the present invention does not limit the design of the lengths d1, d2, d3 and d4 of the first, second, third and fourth fine slits 171, 172, 173 and 174. As long as the overlapping area of the first pixel electrode 131 and the first common electrode 181 is less than that of the second pixel electrode 132 and the second common electrode 182, the present invention encompasses such modification.

Figure 3:
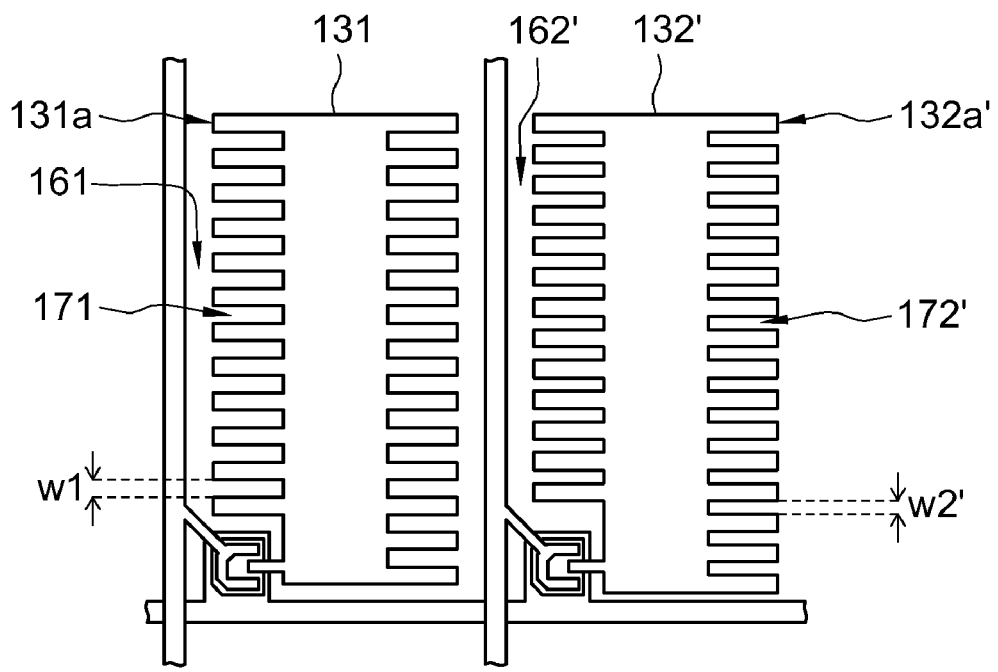
FIG. 3 illustrates the design that a first fine slit and a second fine slit have different widths.

Also, the LCD panel 150 of the present embodiment can apply the design that the widths of the first fine slits 171, the second fine slits 172, the third fine slits 173 and the fourth fine slits 174 are all different. For example, the widths w1 of the first fine slits 171 are greater than the widths w2' of the second fine slits 172 (as shown in FIG. 3), and the widths w3 of the third fine slits 173 are larger than the widths w4 of the fourth fine slits 174. Other designs of changing the widths of the fine slits to make the overlapping area of the first pixel electrode 131 and the first common electrode 181 less than that of the second pixel electrode 132 and the second common electrode 182 are encompassed by the present invention.

In another embodiment, the widths of the first protruding edges 131a, the second protruding edges 132a, the third protruding edges 181a and the fourth protruding edges 182a can be different. For example, the widths of the third protruding edges 181a are less than the widths of the fourth protruding edges 182a. Other designs of changing the widths of the protruding edges to make the overlapping area of the first pixel electrode 131 and the first common electrode 181 less than that of the second pixel electrode 132 and the second common electrode 182 are encompassed by the present invention.

When in practical use, the LCD panel 150 of the present embodiment can apply the designs of rearranging the lengths of the slits, the widths of the slits, the widths of the protruding parts or other modifications to make the overlapping area of the first pixel electrode 131 and the first common electrode 181 less than that of the second pixel electrode 132 and the second common electrode 182. Other designs of changing the size of the protruding edges, the main slits and the fine slits to make the overlapping area of the first pixel electrode 131 and the first common electrode 181 less than that of the second pixel electrode 132 and the second common electrode 182 are encompassed by the present invention.

Figure 5:
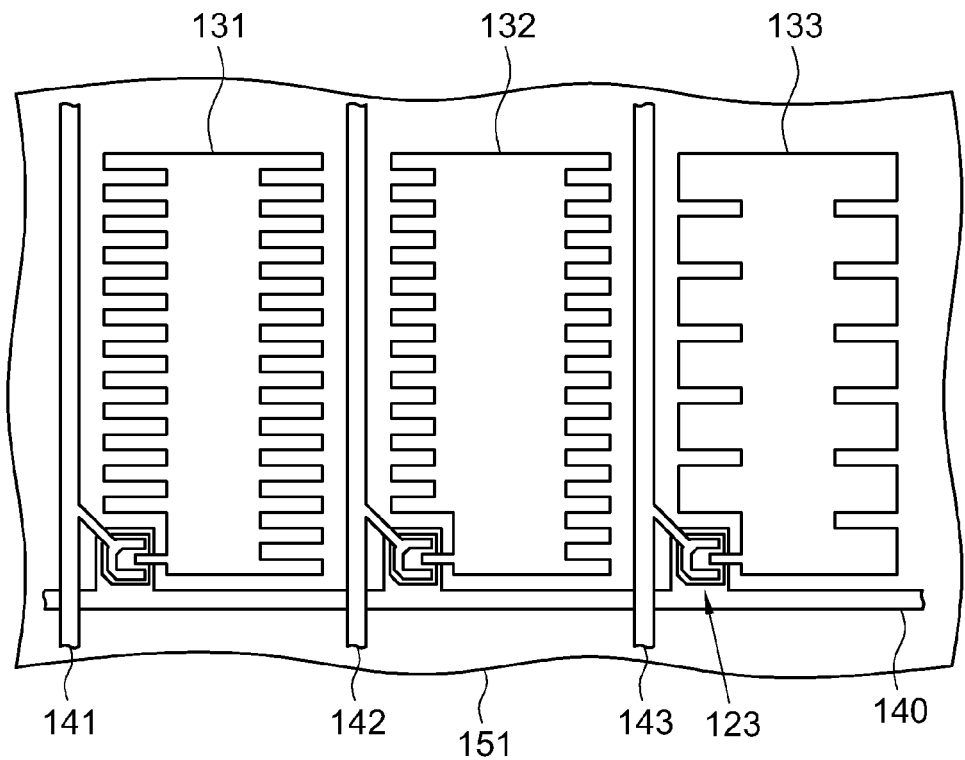
FIG. 5 illustrates the LCD panel including a first pixel electrode, a second pixel electrode and a third pixel electrode.
Figure 8:
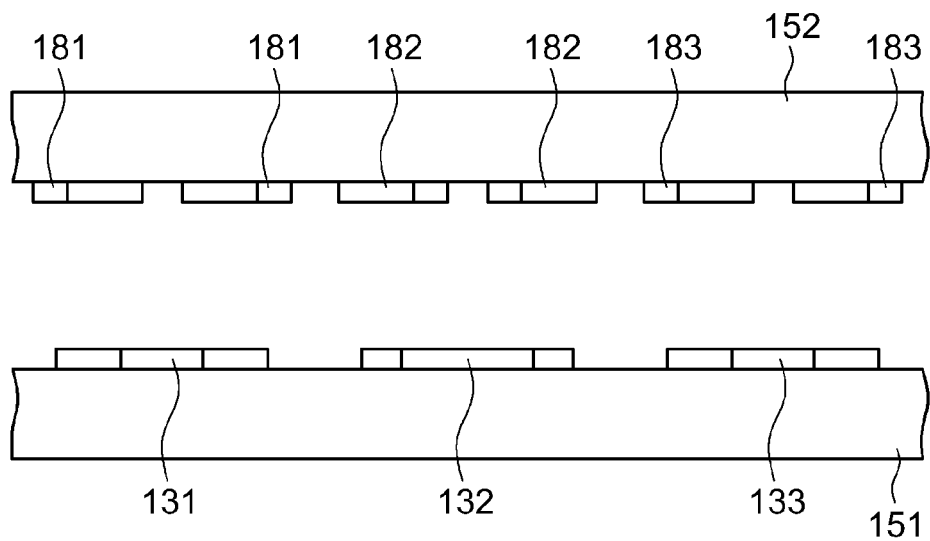
FIG. 8 shows a cross-sectional view of the LCD panel with a third common electrode.

The LCD panel 150 of the LCD device 100 of the present embodiment can include the third data line 143, the third switch element 124 and the third pixel electrode 133, as shown in FIG. 5. More specifically speaking, the LCD panel 150 can further include the third common electrode 183. Please refer to FIG. 8, which shows a cross-sectional view of the LCD panel with the third common electrode. The third common electrode 183 is disposed on the second substrate 152 and corresponding to the third pixel electrode 133. At least part of the third common electrode 183 overlaps the third pixel electrode 133. The lengths and widths of the main slits, the fine slits and the protruding edges can be different from the above-described arrangement for making the overlapping area of the first pixel electrode 131 and the first common electrode 181 less than that of the third pixel electrode 133 and the third common electrode 183. Furthermore, the overlapping area of the second pixel electrode 132 and the second common electrode 182 can be the same as or different from that of the third pixel electrode 133 and the third common electrode 183. In other words, the overlapping area of the first pixel electrode 131 and the first common electrode 181, the overlapping area of the second pixel electrode 132 and the second common electrode 182 and the overlapping area of the third pixel electrode 133 and the third common electrode 183 can be substantially all different. When in practical use, the first pixel electrode 131 and the first common electrode 181 are in the first color pixel. The second pixel electrode 132 and the second common electrode 182 are in the second color pixel. The third pixel electrode 133 and the third common electrode 183 are in the third color pixel.

Figure 9A:
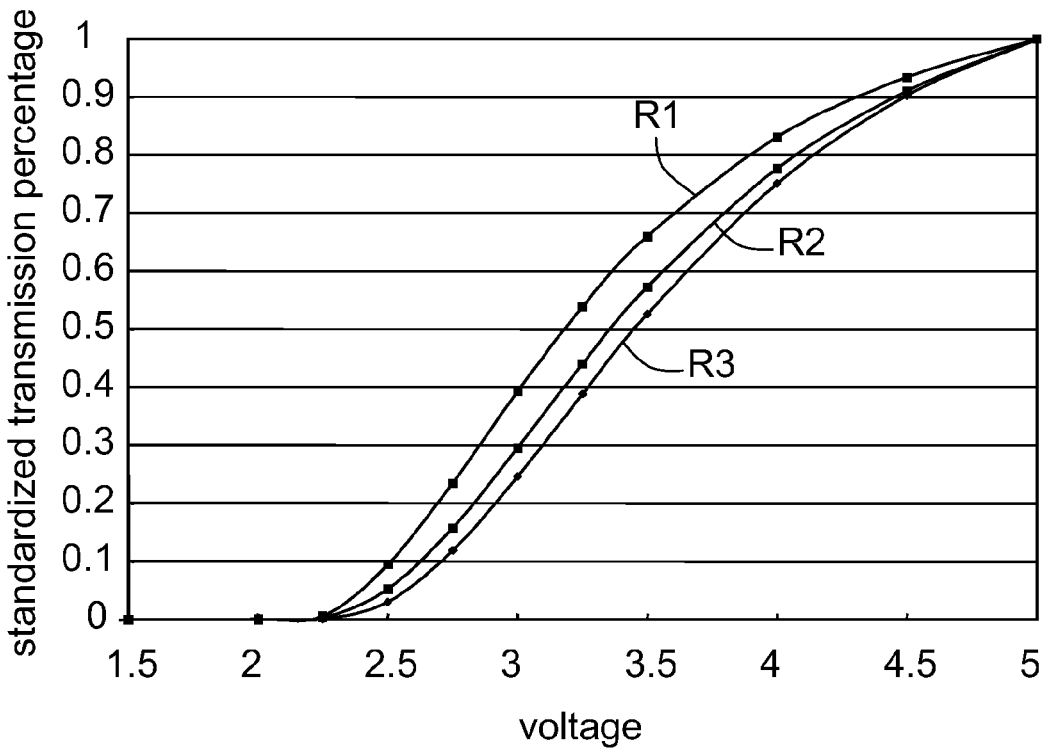
FIGS. 9A~9C respectively show the V-T curve diagrams of different regions when the first pixel electrode and the first common electrode display color.
Figure 9B:
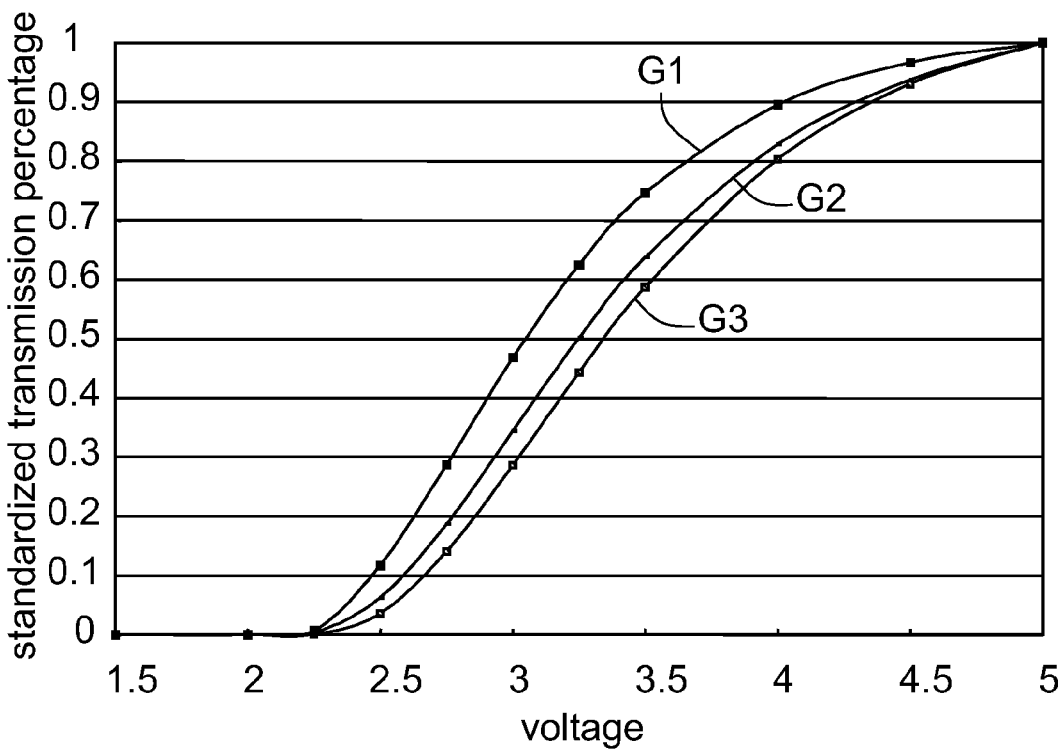
Figure 9C:
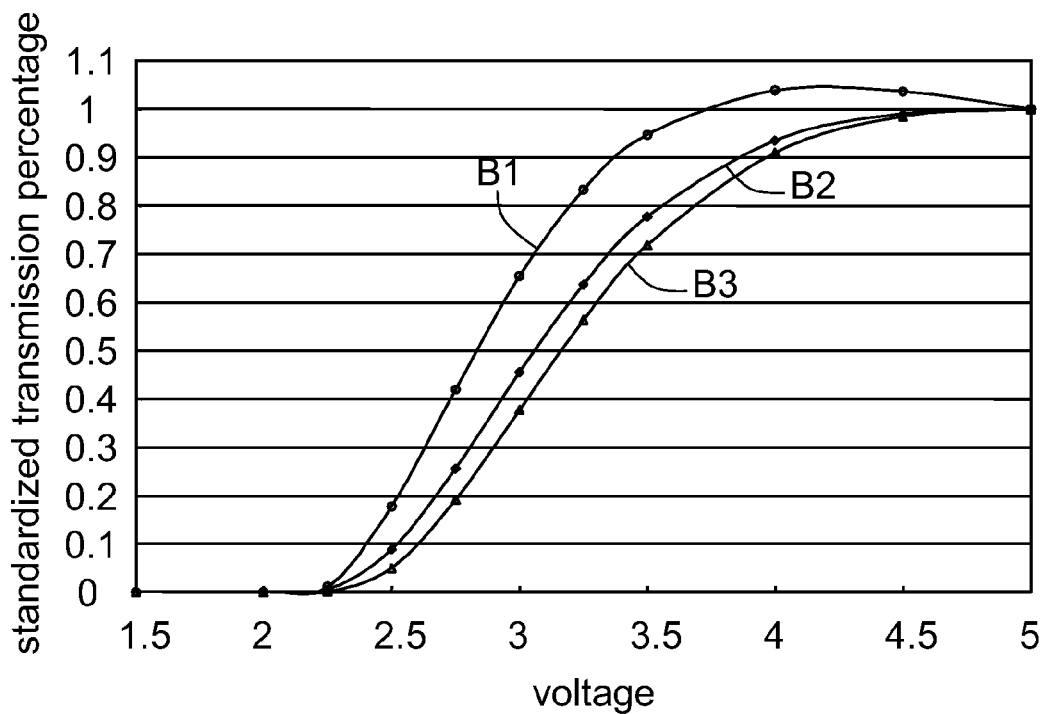

The LCD panel 150 can be classified into three different regions according to the existence of the common electrodes and the pixel electrodes. The first region is the region in which the electrodes are formed on both the first substrate 151 and the second substrate 152. The second region is the region in which the electrodes are formed on one of the first substrate 151 and the second substrate 152, and the fine slits are formed on the other substrate. The third region is the region in which the fine slits are formed on both the first substrate 151 and the second substrate 152. The first pixel electrode 131 and the first common electrode 181 in FIG. 6 are used as an example to perform simulation as follows. Please refer to FIGS. 9A~9C, which respectively show the V-T curve diagrams of different regions when the first pixel electrode and the first common electrode display color. When the first pixel electrode 131 and the first common electrode 181 are used for displaying red, as shown in FIG. 9A, the slope of the V-T curve R1 of the first region is substantially greater than that of the V-T curve R2 of the second region. Also, the slope of the V-T curve R2 of the second region is substantially greater than that of the V-T curve R3 of the third region. Furthermore, when the first pixel electrode 131 and the first common electrode 181 are used for displaying green, as shown in FIG. 9B, the slope of the V-T curve G1 of the first region is substantially greater than that of the V-T curve G2 of the second region. Also, the slope of the V-T curve G2 of the second region is substantially greater than that of the V-T curve G3 of the third region. Moreover, when the first pixel electrode 131 and the first common electrode 181 are used for displaying blue, as shown in FIG. 9C, the slope of the V-T curve B1 of the first region is substantially greater than that of the V-T curve B2 of the second region. Also, the slope of the V-T curve B2 of the second region is substantially greater than that of the V-T curve B3 of the third region.

From the above simulation results, it can be known that when the area of the first main slit 161 and the third main slit 163 of the first pixel electrode 131 and the first common electrode 181 increases, the slope of the V-T curve decreases. In other words, the gamma curve substantially lowers the location in the gamma curve diagram. In the present embodiment, the overlapping area of the first pixel electrode 131 and the first common electrode 181 is less than that of the second pixel electrode 132 and the second common electrode 182. Also, the overlapping area of the first pixel electrode 131 and the first common electrode 181 is less than that of the third pixel electrode 133 and the third common electrode 183. Therefore, the first color pixel corresponding to the first pixel electrode 131 and the first common electrode 181 has the slit area with the greatest percentage. The first pixel electrode 131 of the present embodiment is used for displaying blue as an example. Compared to the conventional color pixels having the slits with the same area, the V-T curve of the blue color of the LCD device 100 of the present embodiment has less slope and is at a lower location in the gamma curve diagram. Accordingly, the red light and green light at the same gray level with higher transmission compensate the blue light at the same gray level with less transmission, so that the white light has the same color temperature at different gray levels. Therefore, the color temperature remains the same at all gray levels.

On the other hand, the first switch element 121 and the second switch element 122 of the present embodiment are thin film transistors (TFT). The LCD panel 150 further includes the first storage capacitor (Cst) and the second storage capacitor. The first storage capacitor is electrically connected to the first pixel electrode 131. The second storage capacitor is electrically connected to the second pixel electrode 132. Generally speaking, when an image is displayed, the pixel voltage generates a feedthrough voltage after the scan line is off. As a result, the liquid crystal 153 (shown in FIG. 1) between the substrates 151 and 152 senses the decreasing of the voltage. The amount that the voltage is decreased is related to the liquid crystal capacitor (Clc), the storage capacitor and the gate-drain capacitor (Cgd) and can be shown as $$\Delta V = \frac{Cgd}{Cst + Clc + Cgd}(Vgh - Vgl).$$

Vgh is the voltage when the gate is on. Vgl is the voltage when the gate is off. The area ratio of the first color pixel used for displaying blue in the present embodiment is greater than that of the red and green color pixel. As a result, the liquid crystal capacitor of the first color pixel is less than the liquid crystal capacitors of the red and green color pixels. Moreover, according to the following relation:

$$\Delta V = \frac{Cgd}{Cst + Clc + Cgd}(Vgh - Vgl) = \frac{1}{[(Cst + Clc)/Cgd] + 1}(Vgh - Vgl),$$

the storage capacitor and the gate-drain capacitor of each color pixel need to apply different designs to maintain the feedthrough voltage to be the same in the first color pixel, the second color pixel and the third color pixel. Following describes two different conditions.

First, when the ratio of the storage capacitor to the liquid crystal capacitor of each color pixel is constant, the liquid crystal capacitor and the first storage capacitor of the first color pixel (displaying blue) are less than those of other color pixels (displaying red and green). Therefore, the sum of the storage capacitor and liquid crystal capacitor of the first color pixel is less than that of red and green color pixels. Also, the gate-drain capacitor of the first color pixel has to be less than that of the second and third color pixels, for maintaining a constant feedthrough voltage. In other words, the gate-drain capacitor of the first TFT in the first color pixel is less than that of the second TFT.

Second, when the ratio of the storage capacitor to the liquid crystal capacitor of each color pixel is not constant, the conditions for three different color pixels to have the same feedthrough voltage is to maintain the same value of (Cst+Clc)/Cgd. The liquid crystal capacitor of the first color pixel (displaying blue) is less than that of the red and green color pixel. Therefore, the storage capacitor and the gate-drain capacitor can be adjusted respectively to maintain the same (Cst+Clc)/Cgd in each color pixel, completely according to the demand.

On the whole, when the ratio of the storage capacitor to the liquid crystal capacitor is constant, the gate-drain capacitor of the blue color pixel has to be the least one in order to maintain the same feedthrough voltage. When the ratio of the storage capacitor to the liquid crystal capacitor is not constant, the storage capacitor and the gate-drain capacitor of each color pixel can be adjusted according to the demand.

In the LCD panel and the LCD device using the same according to the preferred embodiment of the present invention, the areas of the electrodes in different color pixels are different, and the ratios of the slits in different color pixels are different. As a result, the gamma curves of different color pixels compensate each other, so that the displayed image substantially has the same color temperature at different white gray-levels. Therefore, the color temperature remains the same at all white gray-levels, and the display quality of the product is improved. Furthermore, the color temperature shift phenomenon is reduced through the layout of the electrodes. The requirement of the memory capacity for changing the gray levels of different colors is lowered, which reduces the manufacturing cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, comprising:
   a substrate;
   a scan line, disposed on the substrate;
   a first data line and a second data line, disposed on the substrate and perpendicular to the scan line;
   a first switch element, disposed at the intersection of the scan line and the first data line;
   a first pixel electrode, electrically connected to the first switch element, wherein the first pixel electrode comprises a first main slit, a plurality of first fine slits and a plurality of first protruding edges, the plurality of first fine slits and the plurality of first protruding edges are staggered and are corresponding to the first main slit, all the first fine slits corresponding to the first main slit have the same size;
   a second switch element, disposed at the intersection of the scan line and the second data line; and
   a second pixel electrode, electrically connected to the second switch element, wherein the second pixel electrode comprises a second main slit, a plurality of second fine slits and a plurality of second protruding edges, the plurality of second fine slits and the plurality of second protruding edges are staggered and are corresponding to the second main slit, all the second fine slits corresponding to the second main slit have the same size;
   wherein the lengths of the first fine slits are substantially greater than that of the second fine slits, the widths of the first protruding edges are less than that of the second protruding edges, and the area of the first pixel electrode is less than that of the second pixel electrode.

2. The LCD panel according to claim 1, wherein the first pixel electrode is used for displaying blue.

3. The LCD panel according to claim 1, wherein the widths of the first fine slits are substantially greater than that of the second fine slits.

4. The LCD panel according to claim 1 further comprising:
   a first storage capacitor, electrically connected to the first pixel electrode; and
   a second storage capacitor, electrically connected to the second pixel electrode;
   wherein a capacitance of the first storage capacitor is less than a capacitance of the second storage capacitor.

5. The LCD panel according to claim 4, wherein the first switch element and the second switch element are a first thin film transistor (TFT) and a second TFT, and a capacitance of a gate-drain capacitor of the first TFT is less than that of the second TFT.

6. The LCD panel according to claim 1 further comprising:
   a third data line, disposed on the substrate and perpendicular to the scan line;
   a third switch element, disposed at the intersection of the scan line and the third data line; and
   a third pixel electrode, electrically connected to the third switch element;
   wherein the area of the first pixel electrode is less than that of the third pixel electrode.

7. The LCD panel according to claim 6, wherein the area of the first pixel electrode, the area of the second pixel electrode and the area of the third pixel electrode are substantially all different.

8. A liquid crystal display (LCD) panel, comprising:
   a first substrate;
   a scan line, disposed on the first substrate;
   a first data line and a second data line, disposed on the first substrate and perpendicular to the scan line;
   a first switch element, disposed at the intersection of the scan line and the first data line;
   a first pixel electrode, disposed on the first substrate and electrically connected to the first switch element, wherein the first pixel electrode comprises a first main slit, a plurality of first fine slits and a plurality of first protruding edges, the plurality of first fine slits and the plurality of first protruding edges are staggered and are corresponding to the first main slit, all the first fine slits corresponding to the first main slit have the same size;
   a second switch element, disposed at the intersection of the scan line and the second data line;
   a second pixel electrode, disposed on the first substrate and electrically connected to the second switch element, wherein the second pixel electrode comprises a second main slit, a plurality of second fine slits and a plurality of second protruding edges, the plurality of second fine slits and the plurality of second protruding edges are staggered and are corresponding to the second main slit, all the second fine slits corresponding to the second main slit have the same size;
   a second substrate, disposed opposite to the first substrate;
   a first common electrode, disposed on the second substrate, at least part of the first common electrode overlapping the first pixel electrode, wherein the first common electrode comprises a third main slit, a plurality of third fine slits and a plurality of third protruding edges, the plurality of third fine slits and the plurality of third protruding edges are staggered and are corresponding to the third main slit; and
   a second common electrode, disposed on the second substrate, at least part of the second common electrode overlapping the second pixel electrode, wherein the second common electrode comprises a fourth main slit, a plurality of fourth fine slits and a plurality of fourth protruding edges, the plurality of fourth fine slits and the plurality of fourth protruding edges are staggered and are corresponding to the fourth main slit;

wherein the overlapping area of the first pixel electrode and the first common electrode is less than that of the second pixel electrode and the second common electrode.

9. The LCD panel according to claim 8, wherein the lengths of the first fine slits or the third fine slits are greater than that of the second fine slits or the fourth fine slits.

10. The LCD panel according to claim 8, wherein at least some of the first fine slits overlap the third fine slits, and the second fine slits do not overlap the fourth fine slits.

11. The LCD panel according to claim 8, wherein the widths of the first fine slits are greater than that of the second fine slits, and the widths of the third fine slits are greater than that of the fourth fine slits.

12. The LCD panel according to claim 8, wherein the widths of the first fine slits are greater than that of the second fine slits, and the widths of the first protruding edges are less than that of the second protruding edges.

13. The LCD panel according to claim 8, wherein the widths of the third fine slits are greater than that of the fourth fine slits, and the widths of the third protruding edges are less than that of the fourth protruding edges.

14. The LCD panel according to claim 8 further comprising:
   a third data line, disposed on the first substrate and perpendicular to the scan line;
   a third switch element, disposed at the intersection of the scan line and the third data line;
   a third pixel electrode, disposed on the first substrate and electrically connected to the third switch element; and
   a third common electrode, disposed on the second substrate, at least part of the third common electrode overlapping the third pixel electrode;
   wherein the overlapping area of the first pixel electrode and the first common electrode is less than that of the third pixel electrode and the third common electrode.

15. The LCD panel according to claim 14, wherein the overlapping area of the first pixel electrode and the first common electrode, the overlapping area of the second pixel electrode and the second common electrode and the overlapping area of the third pixel electrode and the third common electrode are substantially all different.

* * * * *